United States Patent
Meyers et al.

(10) Patent No.: US 7,224,993 B2
(45) Date of Patent: May 29, 2007

(54) POWER CONTROL METHOD WITH DTX FRAME DETECTION FOR A COMMUNICATION CHANNEL

(75) Inventors: Martin Howard Meyers, Montclair, NJ (US); Alexandro Salvarani, Edison, NJ (US); Carl Francis Weaver, Hanover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 531 days.

(21) Appl. No.: 10/438,105

(22) Filed: May 15, 2003

(65) Prior Publication Data

US 2004/0229639 A1 Nov. 18, 2004

(51) Int. Cl.
 *H04B 7/00* (2006.01)
(52) U.S. Cl. .................. 455/522; 455/515; 455/509
(58) Field of Classification Search .............. 455/522, 455/69, 515, 509; 370/252, 335, 342, 394, 370/336, 345
See application file for complete search history.

(56) References Cited

U.S. PATENT DOCUMENTS

| | | | |
|---|---|---|---|
| 5,430,710 A * | 7/1995 | Mueller et al. ............. | 370/409 |
| 6,400,960 B1 | 6/2002 | Dominique et al. | |
| 6,678,530 B1 * | 1/2004 | Hunzinger .................. | 455/522 |
| 6,850,508 B1 * | 2/2005 | Chang et al. ................ | 370/335 |
| 6,859,456 B1 * | 2/2005 | Hetherington et al. ...... | 370/394 |
| 2002/0082013 A1 | 6/2002 | Lee et al. | |
| 2002/0160782 A1 | 10/2002 | Abhay et al. | |
| 2003/0033568 A1 | 2/2003 | Harris et al. | |
| 2003/0067905 A1 * | 4/2003 | Belaiche .................... | 370/345 |
| 2003/0131299 A1 * | 7/2003 | Ahn et al. ................... | 714/748 |
| 2003/0142632 A1 * | 7/2003 | Lin et al. .................... | 370/252 |
| 2003/0210668 A1 * | 11/2003 | Malladi et al. ............. | 370/335 |
| 2004/0100965 A1 * | 5/2004 | Proctor et al. ............. | 370/394 |
| 2004/0165560 A1 * | 8/2004 | Harris et al. ................ | 370/336 |
| 2005/0174979 A1 * | 8/2005 | Chen et al. ................. | 370/342 |

FOREIGN PATENT DOCUMENTS

| | | |
|---|---|---|
| WO | WO 00/48336 A1 | 8/2000 |
| WO | WO 02/69870 | 9/2001 |
| WO | WO 01/78292 A2 | 10/2001 |
| WO | WO 03/032518 A1 | 4/2003 |

OTHER PUBLICATIONS

European Search Report dated Feb. 28, 2005.
European Search Report dated Dec. 27, 2004.

* cited by examiner

*Primary Examiner*—Matthew Anderson
*Assistant Examiner*—Tan Trinh

(57) ABSTRACT

A method of detecting DTX frames in frames received over a communication channel and a power control method are described, where radio link protocol (RLP) information received over the channel may be received, and one or more frames associated with the RLP information may be determined as an erasure or a DTX frame, based on the RLP information. Such determination may be incorporated into outer loop power control algorithms for adjusting a threshold related to a specified quality of service.

8 Claims, 2 Drawing Sheets

POWER CONTROL METHOD WITH DTX FRAME DETECTION FOR A COMMUNICATION CHANNEL

BACKGROUND OF THE INVENTION

1. Field of the Invention

The present invention is generally related to communication systems, and more particularly, to a power control method with discontinuous transmission (DTX) frame detection in these communication systems.

2. Related Art

In a Code Division Multiple Access (CDMA) system, a power control mechanism is typically used to minimize power consumption and interference while maintaining a desired level of performance. Conventionally, this power control mechanism is implemented with two power control loops. The first power control loop (often referred to as an "inner" power control loop, or "inner loop") adjusts the transmit power to each mobile station such that the signal quality of the transmission received at the mobile station receiver (e.g., as measured by a signal-to-noise ratio) is maintained at a particular target signal-to-noise ratio, or target $E_b/N_0$. The target $E_b/N_0$, where $E_b$ is the energy per information bit, and $N_0$ is the power spectral density of the interference seen by the receiver, is often referred to as a power control set point, or threshold. The second power control loop (often referred to as an "outer" power control loop, or "outer loop") adjusts the threshold such that the desired level of performance, e.g., as measured by a particular target block error rate (BLER), frame error rate (FER), or bit error rate (BER) for example, is maintained.

For example, for link (e.g., forward link or reverse link) power control, the inner loop compares the threshold to a measured $E_b/N_0$ of the received signal. This is periodically measured in a 1.25 ms interval, for example. If measured $E_b/N_0$ is smaller than the threshold, the receiver requests an increase in power on the link. In other words, there are too many decoding errors when the receiver is decoding frames of a received transmission, such that the FER is outside an acceptable range (i.e., too high). If measured $E_b/N_0$ is larger than the threshold, the receiver requests a decrease in power on the link, i.e., the decoded transmission contain no errors, thus the system may be too efficient (FER is below the acceptable range) and transmit power may be being wasted.

The outer loop surrounds the inner loop and operates at a much lower rate than the inner loop, such as at 20 ms intervals, for example. The outer loop maintains the quality of service of the link. If there was no outer loop, the system would operate at a fixed threshold. But, a fixed threshold may not be adequate for changes in channel and/or environmental conditions, such as changes in channel conditions, transmit power, system load, speed of mobile, rate of channel, decoding of channel, etc. The threshold needs to adaptive to changing channel/environmental conditions. The outer loop looks at quality of the link, and if quality is too poor, the outer loop will increase the threshold accordingly. If link quality is too good, (i.e., an FER less than a target FER of about 1% voice transmissions, higher for data transmissions), the outer loop readjusts the threshold so as not to unduly waste system resources.

Outer loop power control may be adversely affected if the wireless communication system permits discontinuous transmission. Discontinuous transmission, or DTX, is a mode of operation in which a base station or mobile station switches its transmitter on and off autonomously when there is no data to send, so as to avoid releasing the channel, which can be costly in terms of resources, processing inefficiencies, etc. Release of channel destroys data throughput, causing an increase in system down time. Data transmission in the DTX mode reduces transmission power and increases the entire system capacity due to the decrease of interference within the system. DTX mode is an efficient way to use base station/mobile station resources. A system in DTX mode however, exhibits a problem when a receiver does not know whether frames have been transmitted or not, because the transmitter in the DTX mode transmits frames unannounced (i.e., autonomously). This makes it difficult for a receiver (such as a base station, for example) to perform power control.

Frames which are transmitted as DTX frames may have similar $E_b/N_0$ to frames that are transmitted, but which contain errors. Frames that are transmitted and received with errors are referred to as "erasures". Accordingly, it may be difficult for the receiver to discriminate between frames transmitted with genuine errors and received with errors (erasures) and frames that have not been transmitted with data, i.e., an empty data frame transmitted with zero gain, for example—the DTX frame.

Current DTX detection procedures at the receiver have attempted to distinguish erasures from DTX frames. Current DTX detectors discriminate based on detection of energy ($E_b/N_0$) only. This has proven difficult, especially if signal strength is low. At a low $E_b/N_0$, DTX detection can be unreliable because a DTX frame may be mistaken as an erasure, and vice versa. These cases of mistaken identity may prevent the outer loop to effectively track changes in link due to changed channel/environmental conditions. Thus, the outer loop at the receiver cannot determine whether to maintain or change the threshold. Since the outer loop sets the threshold for the inner loop to meet, inner loop power control is also affected. In other words, if a DTX detector cannot accurately discriminate between erasures and DTX, power control may be inaccurate, potentially wasting power and/or system resources, causing unnecessary retransmissions and/or an inadvertent release of the channel, unnecessarily increasing system down time. This may translate to loss of link performance and system capacity. Accordingly, there exists a need to accurately detect DTX frames.

SUMMARY OF THE INVENTION

Exemplary embodiments of the present invention are directed to a method of detecting DTX frames in frames received over a communication channel and a method of controlling transmit power, where radio link protocol (RLP) information received over the channel may be received, and one or more frames associated with the RLP information may be determined as an erasure or a DTX frame, based on the RLP information. Such determination may be incorporated into outer loop power control algorithms for adjusting a threshold related to a specified quality of service.

BRIEF DESCRIPTION OF THE DRAWINGS

Exemplary embodiments of the present invention will become more fully understood from the detailed description given hereinbelow and the accompanying drawings, wherein like elements are represented by like reference numerals, which are given by way of illustration only and thus do not limit the exemplary embodiments of the present invention and wherein.

DETAILED DESCRIPTION

In an exemplary embodiment of the present invention, information received over a Radio Link Protocol (RLP) layer (hereinafter "RLP information") of a communication channel may be evaluated in order to determine whether a received frame has no errors, is a DTX frame or an erasure, and whether or not a response message is to be sent to a transmitter for controlling power at which data frames are transmitted over the communication channel. In an exemplary embodiment, DTX frame detection, and hence outer loop power control ("outer loop") may be based on the presence or absence of frame sequence numbers received in the RLP information.

A transmitter sends a packet of data with a plurality of consecutive frame sequence numbers within RLP information appended thereto, as a header to the packet for example. The receiver looks at the frame sequence numbers to make sure the frame sequence numbers are present. Based on whether RLP layer functionality detects a gap in received frame sequence numbers, a receiver may send a suitable response message to the transmitter to re-transmit the missing frame sequence number. The gap in received frame sequence numbers may be defined as a discontinuity in the received frame sequence numbers. The RLP functionality searches for these gaps in the RLP information in order to determine the difference between DTX frames and erasures. A DTX frame has no gaps, since a DTX frame contains no frame sequence numbers; however, an erasure may have a gap between consecutive frame sequence numbers. If a gap is detected, this information may be communicated to the outer loop, as indicated by a cyclic redundancy code (CRC) check failure, for example, so that the outer loop adjusts the threshold.

Using RLP information in the manner described above may provide a solution for effective DTX frame detection and differentiation from erasures, as well as efficient outer loop power control. The method may negate any need for an algorithm or process of using blind detection of DTX frames at the receiver, for example.

If a gap in frame sequence numbers within the RLP information is detected by RLP layer functionality (which may reside at a message switching center (MSC) in communication with one or more base stations, for example), the receiver sends a response message, such as a negative acknowledgment (NACK), requesting re-transmission of the missing frame sequence number. The method may be implemented in a receiver that may be part of transceiver circuitry within a base station or a wireless mobile station, for example. Alternatively, the method may be implemented at a MSC in communication with one or more base stations, each base station serving one or more mobiles within a particular sector or cell of a particular wireless system.

Figure 1:
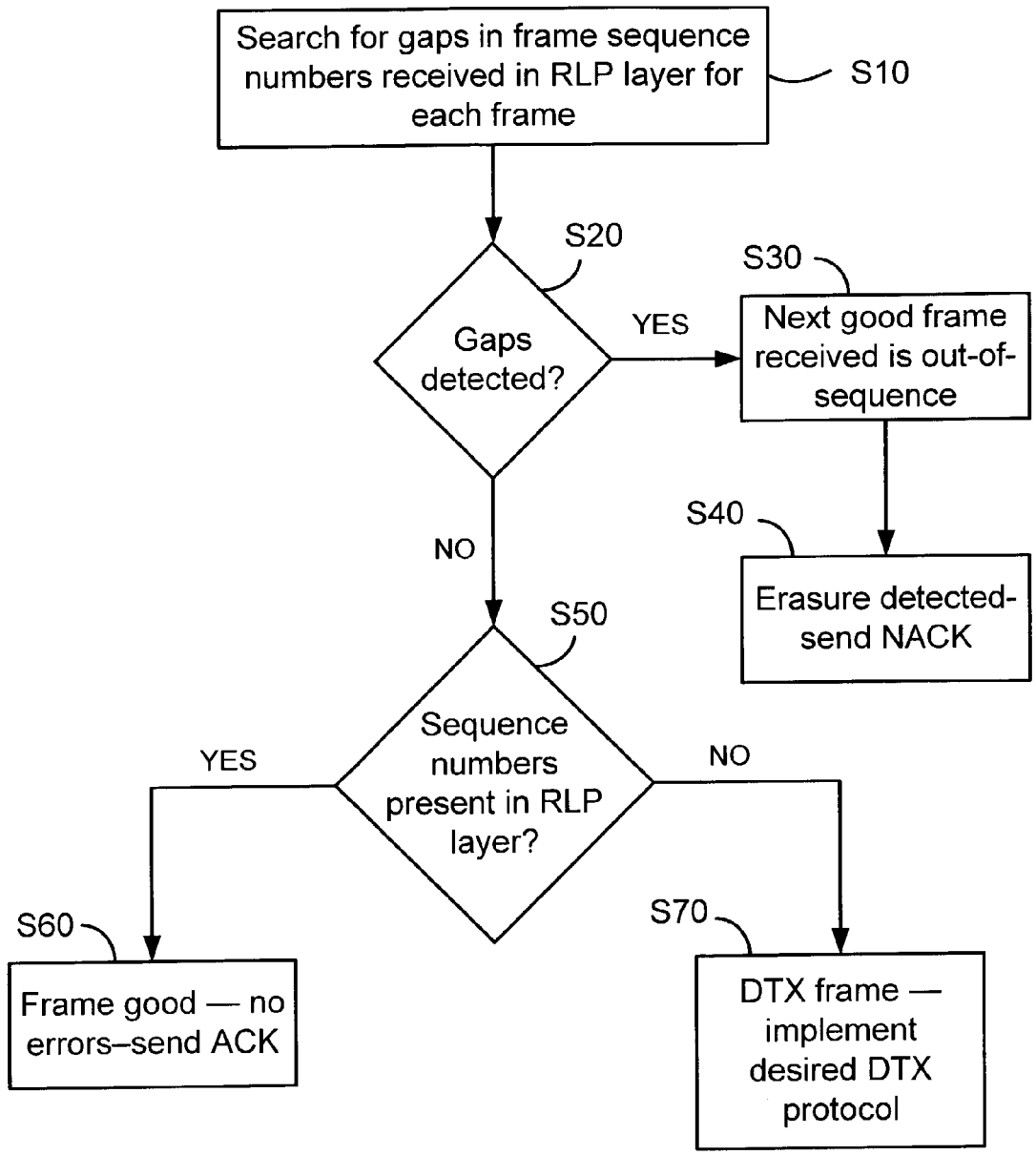
FIG. 1 is a flow diagram illustrating a method in accordance with an exemplary embodiment of the invention.

FIG. 1 is a flow diagram illustrating a method in accordance with an exemplary embodiment of the invention. The link layer of a communication channel typically supports a Radio Link Protocol (RLP) for multiplexing, flow control and retransmission capability. The RLP layer is activated between a transmitter and receiver over the link when a data frame is transmitted. RLP layer functionality searches for gaps in a string of frame sequence numbers within RLP information that is appended to a transmitted packet as a header, for example.

Accordingly, in the method, RLP layer functionality searches (Step S10) for gaps in frame sequence numbers contained in the RLP information. At the receiver, if a gap in frame sequence numbers is detected (output of Step S20 is YES) and the next "good" frame (frame carrying data having no errors, as evidenced by a CRC code without errors, for example) received is out of sequence (Step S30), the receiver determines (Step S40) that an erasure has just been received, and sends a response message, which may be in the form of negative acknowledgments (NACKs), for example. In the case that an erasure is detected, the retransmission request is sent to the transmitter with information indicting the gap or missing frame sequence number.

If no gap in frame sequence numbers is detected (output of Step S20 is NO), the RLP layer functionality determines (Step S50) whether or not frame sequence numbers are even present in the RLP information. If so, and no gap has been detected (output of Step S50 is YES), the frame is satisfactorily received (Step S60); there is no error and a response message such as an acknowledgment (ACK) may be sent to the transmitter.

If the output of Step S50 is NO, a DTX frame has just been received from the transmitter, and the outer loop at the receiver may implement a desired DTX protocol (Step S70). This DTX protocol may be to maintain the current threshold, converge to a system power level, shift up or down to a reference threshold, maintain the current threshold and wait a specified amount of time to determine if additional DTX frames are being transmitted, etc., or a protocol that may depend on whether the receiver is in soft handoff, or any other DTX protocol evident to those skilled in the art. Accordingly, frame sequence number information received in the RLP information may be used to differentiate DTX frames from erasures.

Figure 2:
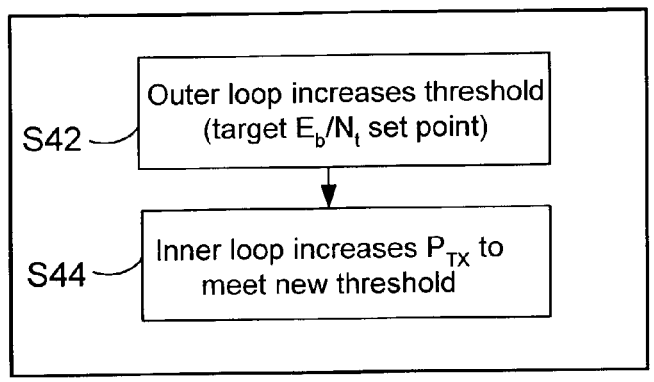
FIG. 2 is a flow diagram illustrating an adjustment to transmit power in accordance with an exemplary embodiment of the invention.

FIG. 2 is a flow diagram illustrating an adjustment to transmit power in accordance with an exemplary embodiment of the invention. When an erasure is correctly detected, the outer loop increases the threshold (i.e., target $E_b/N_0$ set point) (Step S42). In an exemplary CDMA communication system for example, the inner loop power control algorithm ("inner loop") is designed to meet a target, e.g., the threshold set by the outer loop. Thus, the inner loop will adjust transmission power $P_{TX}$ (Step S44) in order to reduce the number of errors sent in transmitted data frames to an acceptable level, for example, such that a desired FER of about 1% may be achieved. On the other hand, if a DTX frame is received, the outer loop may implement a desired DTX protocol to maintain or adjust the threshold so as to maintain link quality, i.e., the desired system FER, BLER, BER, etc.

Based on an ability to distinguish between DTX frames and erasures, transmit power may be adjusted when an erasure is successfully detected, and maintained at current levels and/or adjusted using a DTX protocol at the outer loop when DTX frames are received. In this way, the outer loop may be able to correctly and accurately treat both received DTX frames and received erasures, based on the frame sequence number gaps present in the received RLP information. Frame sequence numbers may be received continuously at the receiver, thus avoiding discontinuity of the input of the power control outer loop. This may increase reliability of the information used by the outer loop and may avoid having to perform any specific DTX detection altogether.

Figure 3:
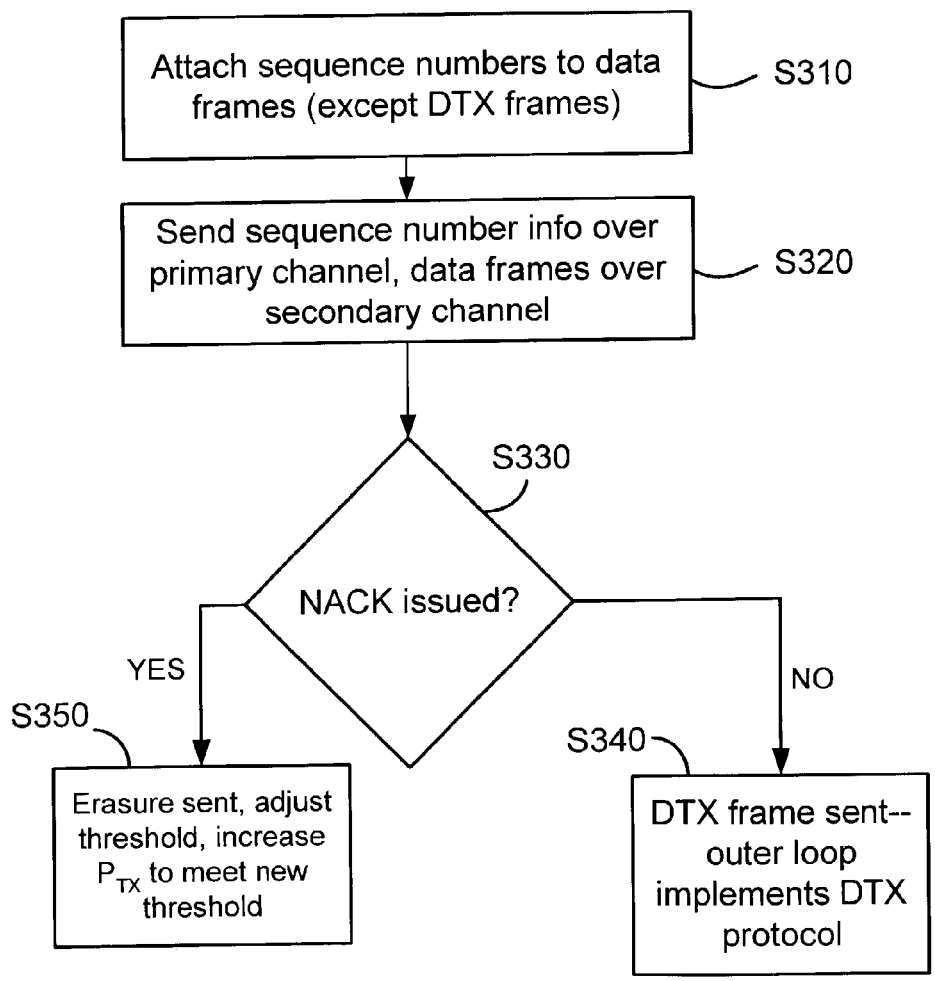
FIG. 3 is a flow diagram illustrating a method with respect to a transmitter in accordance with an exemplary embodiment of the invention.

FIG. 3 is a flow diagram illustrating a method with respect to a transmitter in accordance with an exemplary embodiment of the invention. The RLP layer functionality at the transmitter knows when it is sending data frames to a receiver, since the RLP layer is activated when data (i.e., a data packet) is transmitted. The RLP layer functionality normally dictates that a frame sequence number be attached to each data frame that is transmitted. If there is no data to send, a transmitter may DTX (e.g., send a DTX frame with zero gain), and thus will not send any frame sequence number in the RLP layer.

Thus, a transmitter attaches frame sequence numbers to all data frames (Step S310), but does not attach or send frame sequence numbers for DTX frames. The frame sequence number information is included in the RLP information sent over a primary channel, while data frames are sent over secondary channels (Step S320). If a NACK is issued (which means a gap has been detected) in response to the transmission (output of Step S330 is YES), one or more of the data frames sent by the transmitter sent were received in error (e.g., as erasures). In other words, the RLP layer functionality informs the outer loop of the gap, which may be embodied as a CRC check failure, for example. The outer loop thus increases the threshold, and the transmitter will increase its transmit power PTX (Step S350) under the control of the inner loop, to retransmit those erasures. As discussed above, the inner loop attempts to meet a new threshold (increased target $E_b/N_0$ set point) determined by the outer loop.

If no NACK is issued (output of Step S330 is NO), the transmitter keeps transmitting, as it already knows that it sent a DTX frame without data, and thus no frame sequence number was attached to the frame. However, since a DTX frame contains CRC errors, the outer loop may implement a desired DTX protocol, as discussed above, in order to maintain the link.

The above exemplary embodiment may also be used to power control a secondary channel that is allowed to DTX. Primary channels and secondary channels are part of respective active sets of channels. The active set of primary channels and the active set of secondary channels may be allocated to a particular user for established communications between the user and one or more base stations. The base stations (or a sector of a cell) are members of the active set; i.e., the members are mapped (i.e., connected) to channel connections.

A secondary channel may be less reliable than the primary channel. This may be the case, for example, if the secondary channel operates in a reduced active set. A reduced active set condition occurs when members of the active set of the secondary channel are a subset of the active set of the primary channel (e.g. the primary channel is in soft handoff with multiple base stations, while the secondary channel is only connected to a single base station. Currently, if a frame over a secondary channel is received as an erasure due to a fade in the channel, for example, the retransmission request would normally be issued only after a good frame with a good frame sequence number has been received. However, it may take too many frames in order to get to a "good" frame (frame transmitted and received without errors, as evidenced by no CRC errors) if the fade is long, which may translate into a burst of errors across many frames. In addition, if the frame sequence number gap is detected too late (i.e. the outer loop may not get this information quickly enough), additional latency may be added to the outer loop, degrading its performance.

To overcome these problems, the transmitter may send data frames with the associated frame sequence numbers in the primary channel as well as in the secondary channel. In this way, the receiver may receive reliable frame sequence numbers in every frame over the primary channel, as described above, which would allow the detection of sequence gaps with minimal latency. Frame sequence numbers are sent with each frame of data in the primary and secondary channel.

Thus, as was described above in FIG. 1, RLP layer functionality searches for gaps in frame sequence numbers contained in the RLP layer received over the primary channel, and if a gap in frame sequence numbers is detected, and the next "good" frame received is out of sequence, the outer loop determines that an erasure has just been received, and issues a NACK. In the case an erasure is detected, the NACK is issued to the transmitter with information indicting the frame sequence number of the missing frame. If no gap in frame sequence numbers is detected, the RLP layer functionality determines whether or not frame sequence numbers are even present in the RLP layer. If so, and no gap has been detected, the frame is satisfactorily received, there is no error and an ACK may be sent to the transmitter, as is known. Otherwise, as described with respect to FIG. 1, a DTX frame has just been received, and the outer loop at the receiver may implement a DTX protocol, i.e., maintain current threshold, converge to a system power level, shift up or down to a reference threshold, maintain the current threshold and wait a specified amount of time to determine if additional DTX frames are being transmitted, etc. Accordingly, frame sequence number within RLP information received over a primary channel may used by the outer loop to power control secondary channels As a further illustration, if the receiver receives a burst of erasures, the receiver will generate a gap in the frame sequence number of the frames transmitted in the primary and secondary channels. Since the primary channel is reliable, the gap in the frame sequence number will be detected, as described above, with minimum delay and will be used by the outer loop for power control of secondary channels. The speed of the primary channel is not of concern, only the primary channel's reliability and latency. Since frame sequence numbers of data frames transported in primary and/or secondary channels are all sent in the primary channels, bursts of erasures in the secondary channel do not delay the detection, at the receiver, of gaps in the frame sequence numbers.

The exemplary embodiments of the present invention being thus described, it will be obvious that the same may be varied in many ways. Such variations are not to be regarded as a departure and scope of the exemplary embodiments of the present invention, and all such modifications as would be obvious to one skilled in the art are intended to be included within the scope of the following claims.

What is claimed:

1. In a wireless communications system employing primary channels and secondary channels having a discontinuous transmission (DTX) mode capability, a method of performing outer loop power control for a secondary channel, comprising:

receiving radio link protocol (RLP) information over the primary channel, said RLP information containing frame sequence number information of data frames sent over both said primary channels and said secondary channels;

determining whether one or more frames associated with said RLP information in said secondary channel has been received as an erasure or a DTX frame, based on said RLP information; and adjusting a threshold related to a specified quality of service for power control of said secondary channel in accordance with said determining.

2. The method of claim 1, wherein said determining further includes detecting whether there are any gaps in said frame sequence numbers.

3. The method of claim 2, said determining further including determining that an erasure has been received, if said detecting detects a gap in said received frame sequence numbers, an erasure being a data frame that is received with errors.

4. The method of claim 3, further comprising:

sending a negative acknowledgment (NACK) with the frame sequence number of the missing frame in said secondary channel.

5. The method of 4, said NACK additionally specifying a revised threshold value that is met by increasing transmit power over said secondary channel.

6. A method of detecting discontinued transmission (DTX) frames in frames received over a secondary communication channel, comprising:

receiving radio link protocol (RLP) information including frame sequence numbers over a primary channel; and determining whether one or more frames associated with said RLP information has been received as an erasure or a DTX frame, based on said RLP information, wherein said RLP information received over the primary channel contains frame sequence numbers of said one or more frames, wherein said determining further including detecting whether there are any gaps in said received frame sequence numbers, and wherein said determining further including determining that a DTX frame has been received, if said detecting detects no gaps and no frame sequence numbers in said RLP information, said DTX frame being a frame sent without data.

7. In a wireless communications system employing primary channels and secondary channels having a discontinuous transmission (DTX) mode capability, an outer loop power control method for a secondary channel that includes detecting DTX frames comprising:

receiving radio link protocol (RLP) information including frame sequence numbers over a primary channel; and determining whether one or more frames associated with said RLP information has been received as an erasure or a DTX frame, based on said RLP information.

8. In a wireless communications system employing primary channels and secondary channels having a discontinuous transmission (DTX) mode capability, a method of controlling transmit power for the secondary channel comprising:

transmitting frames that include radio link protocol (RLP) information including frame sequence numbers over a primary channel; and adjusting transmit power for the secondary communication channel at which said frames are transmitted based on a response message received in response to said transmitted RLP information.

* * * * *